United States Patent
Ra et al.

(10) Patent No.: US 7,990,971 B2
(45) Date of Patent: Aug. 2, 2011

(54) PACKET PROCESSING APPARATUS AND METHOD CODEX

(75) Inventors: Yong Wook Ra, Daejeon (KR); Chang Ho Choi, Daejeon (KR); Byung Jun Ahn, Daejeon (KR); Kyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 237 days.

(21) Appl. No.: 12/150,668

(22) Filed: Apr. 30, 2008

(65) Prior Publication Data
US 2009/0080452 A1    Mar. 26, 2009

(30) Foreign Application Priority Data

Sep. 21, 2007   (KR) .................. 10-2007-0096880

(51) Int. Cl.
*H04L 12/56*      (2006.01)
(52) U.S. Cl. ......... 370/392; 370/419; 370/466; 370/474
(58) Field of Classification Search .................. None
See application file for complete search history.

(56) References Cited

U.S. PATENT DOCUMENTS

| | | | | |
|---|---|---|---|---|
| 5,509,126 | A * | 4/1996 | Oprescu et al. | 710/307 |
| 6,198,722 | B1 * | 3/2001 | Bunch | 370/229 |
| 6,400,682 | B1 * | 6/2002 | Regula | 370/223 |
| 6,553,031 | B1 * | 4/2003 | Nakamura et al. | 370/392 |
| 7,567,561 | B2 * | 7/2009 | Toumura | 370/389 |
| 2004/0008728 | A1 * | 1/2004 | Lee | 370/474 |
| 2004/0062267 | A1 * | 4/2004 | Minami et al. | 370/463 |
| 2004/0141524 | A1 | 7/2004 | Lee et al. | |
| 2004/0223502 | A1 | 11/2004 | Wybenga et al. | |
| 2005/0226144 | A1 * | 10/2005 | Okita | 370/219 |
| 2006/0114899 | A1 * | 6/2006 | Toumura et al. | 370/389 |
| 2006/0251071 | A1 | 11/2006 | Oh et al. | |
| 2007/0086456 | A1 | 4/2007 | Kim et al. | |
| 2007/0133560 | A1 | 6/2007 | Nam et al. | |
| 2007/0160042 | A1 * | 7/2007 | Dollo et al. | 370/389 |
| 2008/0091857 | A1 * | 4/2008 | McDaniel | 710/72 |
| 2008/0253371 | A1 * | 10/2008 | Saxena | 370/390 |
| 2009/0073977 | A1 * | 3/2009 | Hussain et al. | 370/389 |

FOREIGN PATENT DOCUMENTS

| | | |
|---|---|---|
| KR | 10-2004-0053839 | 6/2004 |
| KR | 10-2004-0095632 | 11/2004 |
| KR | 10-2005-0072642 | 7/2005 |
| KR | 10-2007-0059833 | 6/2007 |

* cited by examiner

*Primary Examiner* — Robert C Scheibel
(74) *Attorney, Agent, or Firm* — Blakely, Sokoloff, Taylor & Zafman

(57) ABSTRACT

A packet processing apparatus and method are provided. The packet processing apparatus changes a size of an input packet, analyzes the input packet to perform a second layer associated process, generates basic delivery headers of the input packet, processes the input packet to which the basic delivery headers are inserted according to a type of the input packet, transforms the header of the input packet to which the basic delivery headers are inserted, and transitions the header-transformed input packet to delivers the packet. Accordingly, it is possible to process various packets without addition of separate process to the packet processing apparatus. In addition, a use efficiency of a network processing unit can be optimized, so that it is possible to increase a packet processing rate and performance.

19 Claims, 21 Drawing Sheets

| Byte Lane | 7 | 6 | 5 | 4 | 3 | 2 | 1 | 0 | Clock Cycle |
|---|---|---|---|---|---|---|---|---|---|
| | [63:56] | [55:48] | [47:40] | [39:32] | [31:24] | [23:16] | [15:8] | [7:0] | |
| | SFD | 0x55 | 0x55 | 0x55 | 0x55 | 0x55 | 0x55 | 0xD5 | 0 |
| | DA_0 | DA_1 | DA_2 | DA_3 | DA_4 | DA_5 | SA_0 | SA_1 | 1 |
| | SA_2 | SA_3 | SA_4 | SA_5 | TYPE_0 | TYPE_1 | MPLS_0 | MPLS_1 | 2 |
| | MPLS_2 | MPLS_3 | V/TC_0 | TC_1/FL_0 | FL_1 | FL_2 | LEN_0 | LEN_1 | 3 |
| | NHDR | HLIM | SA6_0 | SA6_1 | SA6_2 | SA6_3 | SA6_4 | SA6_5 | 4 |
| | SA6_6 | SA6_7 | SA6_8 | SA6_9 | SA6_10 | SA6_11 | SA6_12 | SA6_13 | 5 |
| | SA6_14 | SA6_15 | DA6_0 | DA6_1 | DA6_2 | DA6_3 | DA6_4 | DA6_5 | 6 |
| | DA6_6 | DA6_7 | DA6_8 | DA6_9 | DA6_10 | DA6_11 | DA6_12 | DA6_13 | 7 |
| | DA6_14 | DA6_15 | | | | | | | 8 |

Packet Format A ~310

FIG. 9A

| Byte Lane | 7 | 6 | 5 | 4 | 3 | 2 | 1 | 0 | Clock Cycle |
|---|---|---|---|---|---|---|---|---|---|
| | [63:56] | [55:48] | [47:40] | [39:32] | [31:24] | [23:16] | [15:8] | [7:0] | |
| | Transitional Header | | | | Delivery Header_2v4 | | | | 0 |
| | | Delivery Header_1v4 | | | DA_4 | DA_5 | SA_0 | SA_1 | 1 |
| | SA_2 | SA_3 | SA_4 | SA_5 | TYPE_0 | TYPE_1 | MPLS_0 | MPLS_1 | 2 |
| | MPLS_2 | MPLS_3 | V/TC_0 | TC_1/FL_0 | FL_1 | FL_2 | LEN_0 | LEN_1 | 3 |
| | NHDR | HLIM | SA6_0 | SA6_1 | SA6_2 | SA6_3 | SA6_4 | SA6_5 | 4 |
| | SA6_6 | SA6_7 | SA6_8 | SA6_9 | SA6_10 | SA6_11 | SA6_12 | SA6_13 | 5 |
| | SA6_14 | SA6_15 | DA6_0 | DA6_1 | DA6_2 | DA6_3 | DA6_4 | DA6_5 | 6 |
| | DA6_6 | DA6_7 | DA6_8 | DA6_9 | DA6_10 | DA6_11 | DA6_12 | DA6_13 | 7 |
| | DA6_14 | DA6_15 | | | | | | | 8 |

Packet Format C ─ 330

FIG. 9C

Packet Format D

Packet Format E

Packet Format F

PACKET PROCESSING APPARATUS AND METHOD CODEX

CROSS-REFERENCE TO RELATED APPLICATIONS

This application claims the priority of Korean Patent Application No. 2007-96880 filed on September 21, in the Korean Intellectual Property Office, the disclosure of which is incorporated herein by reference.

BACKGROUND OF THE INVENTION

1. Field of the Invention

The present invention relates to a packet processing apparatus and method in a packet switch system, and more particularly, to a packet processing apparatus and method using a network processor or a packet processor.

The present invention was supported by the IT R&D program of MIC/IITA[2006-S-061-02, R&D on Router Technology for IPv6 based QoS Services and Host Mobility].

2. Description of the Related Art

Due to rapid increase in amount of data traffic according to popularization of the Internet and due to advent of new types of services according to integration of wire and wireless Internets, conventional network apparatuses have problems in terms of processing capacity and performance. In order to solve the problems, network processors have been proposed. However, in network apparatuses using such network processors, all packet processing functions are allocated to only the network processors. Since functions for supporting various types of multimedia services and applications are loaded on the network processors, there is a problem of deterioration in performance of the network processors. In order to solve the problems, some of conventional packet processors, buffers corresponding to packet types are disposed in front of the network processors, or engines for the network processors are variably used so as to increase use efficiency thereof.

As an example of the general packet processing apparatus, an IP packet processing apparatus using a network processor will be described with reference to FIG. 1.

As shown in FIG. 1, the IP packet processing apparatus using a network processor includes 8 micro engines 11 to 18 of the network processor. The micro engines 11 to 18 includes a packet receiver (Packet_Rx) 11, a packet classifier (Ethernet_Decap/Classify) 12, an IPv4 packet/IPv6 packet forwarder (IPv6_Unicast/Multicast Forwarder) 13, a packet queue manager 14, a packet scheduler 15, a multicast packet copier 16, and a packet transmitter (Packet_Tx/Ethernet_Encap) 17.

As another example of the general packet processing apparatuses, there is a packet processing apparatus shown in FIG. 2. The packet processing apparatus is used for a point-to-point protocol (hereinafter, referred to as PPP) header. The packet processing apparatus includes a protocol field lookup unit 21, a buffer manager 22, buffers 23 to 24 required for data transmission, and IPv4 and IPv6 packet processors 25 and 26 in the network processor. In this case, the two buffers, that is, the buffer_1 23 for storing an IPv4 packet and the buffer_2 24 for storing an IPv6 packet are used. That is, the buffer_1 23 is a buffer for storing the IPv4 packet, and the buffer_2 24 is a buffer for storing the IPv6 packet.

In addition, as still another example of the general packet processing apparatus, there is a PPP data frame processing apparatus shown in FIG. 3. The PPP data frame processing apparatus 30 includes a fabric interface 31 for data exchange with an external switch board, first and second PPP data analysis modules 32 and 33 for analyzing a PPP data frame received through the fabric interface 31, and a host 34 for controlling a sub-control of the PPP data frame. The first PPP data analysis module 32 includes a first processor for analyzing a PPP data and recovering a data according to the sub-control included in the PPP data and a second processor for removing a header of the PPP data. The second PPP data analysis module 33 includes a third processor for inserting a header into an IP data and a fourth processor for converting the IP data into a PPP data format.

Functions and operations of the packet processing apparatuses are well known to the ordinarily skilled in the related art, and thus, detailed description thereof is omitted. Basic headers of the IPv4 packet and the IPv6 packet processed by the conventional packet processing apparatus are headers of IPv4 and IPv6 standard protocols. The structures of the basic header field format s are shown in FIGS. 4 and 5. Since a structure of the basic header field format are well known to the ordinarily skilled in the art, detailed description thereof is omitted.

The conventional packet processing apparatuses shown in FIGS. 1 to 3 has problems as follows.

In the IP packet processing apparatus using the network processor shown in FIG. 1, micro engines of the network processors are not fixed allocated, but micro engines having variable functions are used so as to dynamically allocate resources according to packet types of the received packets and packet amounts thereof, so that the network processors can be effectively used for processing packets. However, since the entire packet processing functions are still allocated to the network processors, as the number of supported protocols are increased, there is a problem of a deterioration in performance of the network processors.

In the packet processing apparatus shown in FIG. 2, packets classified according to types of protocols are buffered, so that the packets classified according to the types of protocol can be independently processed by the network processors. Accordingly, processing operations corresponding to non-supported protocols can be omitted, so that it is possible to prevent a waste of resources. In addition, in the packet processing apparatus, a buffer manager can dynamically adjust buffer sizes allocated to network protocols, so that efficient communication can be implemented according to packet amounts of received packets and a change in packet amounts. However, in the packet processing apparatus, the buffer management is performed by using simple protocol lookup, but actual packet processing is not performed. Therefore, packet processing amount of the network processor is not changed. In particular, when various types of protocols such as routing protocol or multi-protocol label switching (MPLS) are loaded on the network processor of the packet processing apparatus, the performance of the actual system is deteriorated.

In the PPP data frame processing apparatus shown in FIG. 3, network processors including a plurality of processors capable of processing data frames as well as different functions thereof are used to generate and analyze PPP data frames in a hardware manner, so that a large amount of PPP data can be processed at a high rate. However, the PPP data frame processing apparatus has a problem in that the PPP data frame processing apparatus can not completely process packets having Ethernet frames that generally occupy more than 80% of the entire network frames. In order to solve the problem, additional processors having functions of processing the Ethernet packets are needed. Since the functions of processing the Ethernet packets are added, the PPP data frame processing apparatus increases a burden to the actual network processors, so that the performance of the system is deteriorated.

Recently, a large number of IPv6 applications newly appear, and a line speed required for an increase in traffics is rapidly increased. In addition, gigabyte switches are mainly used, and further more, switches using 10-gigabyte uplink ports are also proposed. Accordingly, the performance of the system supporting various types of applications becomes one of the very impotent factors.

SUMMARY OF THE INVENTION

The present invention provides a packet processing apparatus and method capable of various types of Ethernet packets without additional processing operations causing deterioration in performance in a case where a network processor or a packet processor processes only packets according to PPP protocol or PPP protocol without support of the Ethernet.

The present invention also provides a packet processing apparatus and method capable of performing basic packet processing by using only hardware logics and capable of inserting delivery headers and transforming packet headers without deterioration in a line speed in order to support quality-of-service (QoS) and various types of protocols.

According to an aspect of the present invention, there is provided a packet processing apparatus comprising: a receiver converting an input packet to a packet having a internal data bus size and generating a data control signal; a packet pre-processing unit analyzing the input packet transferred from the input packet to generate basic delivery headers and performing a second layer associated process; a protocol translation unit processing the input packet according to a type of the input packet and including modules of protocol engines for inserting and removing necessary engines; a header processing unit moving a transitional header TH in the generated delivery header and inserting a PPP (point-to-point protocol) header in the input packet; and a transmitter converting the input packet and the control signal and transmitting a converted input packet and a converted the control signal.

According to another aspect of the present invention, there is provided a packet processing method comprising: changing a size of an input packet; analyzing the input packet and performing a second layer associated process; generating basic delivery headers of the input packet; processing the input packet to which the basic delivery headers are inserted, according to a type of the input packet; transforming the header of the input packet to which the basic delivery headers are inserted; and transitioning the header-transformed input packet and delivering the packet, thereby processing various packets without addition of separate process to a packet processing apparatus.

As described above, according to the present invention, it is possible to process various types of Ethernet packets without additional processing operations. In addition, by inserting delivery headers and transforming packet header, it is possible to prevent a decrease in a line speed. Accordingly, a use efficiency of a network processor can be optimized, so that it is possible to increase a packet processing rate and performance.

BRIEF DESCRIPTION OF THE DRAWINGS

The above and other features and advantages of the present invention will become more apparent by describing in detail exemplary embodiments thereof with reference to the attached drawings in which:

FIG. 9A to 9F is a view illustrating a packet transitioning operation in a packet processing apparatus according to an embodiment of the present invention;

DETAILED DESCRIPTION OF THE PREFERRED EMBODIMENT

Hereinafter, embodiments of the present invention will be described in detail with reference to the accompanying drawings. For clarifying the present invention, detailed description of well-known functions and constructions will be omitted.

In an embodiment of the present invention, a packet processing apparatus uses a network processor or a packet processor. The network processor or the packet processor processes only point-to-point protocol (hereinafter, referred to as PPP) and a multi protocol label switching (hereinafter, referred to as MPLS) protocol without support of the Ethernet. The network processor or the packet processor processes an Ethernet packet without additional processing operation. Now, a configuration of the packet processing apparatus will be described in detail with reference to the accompanying drawings.

Figure 1:
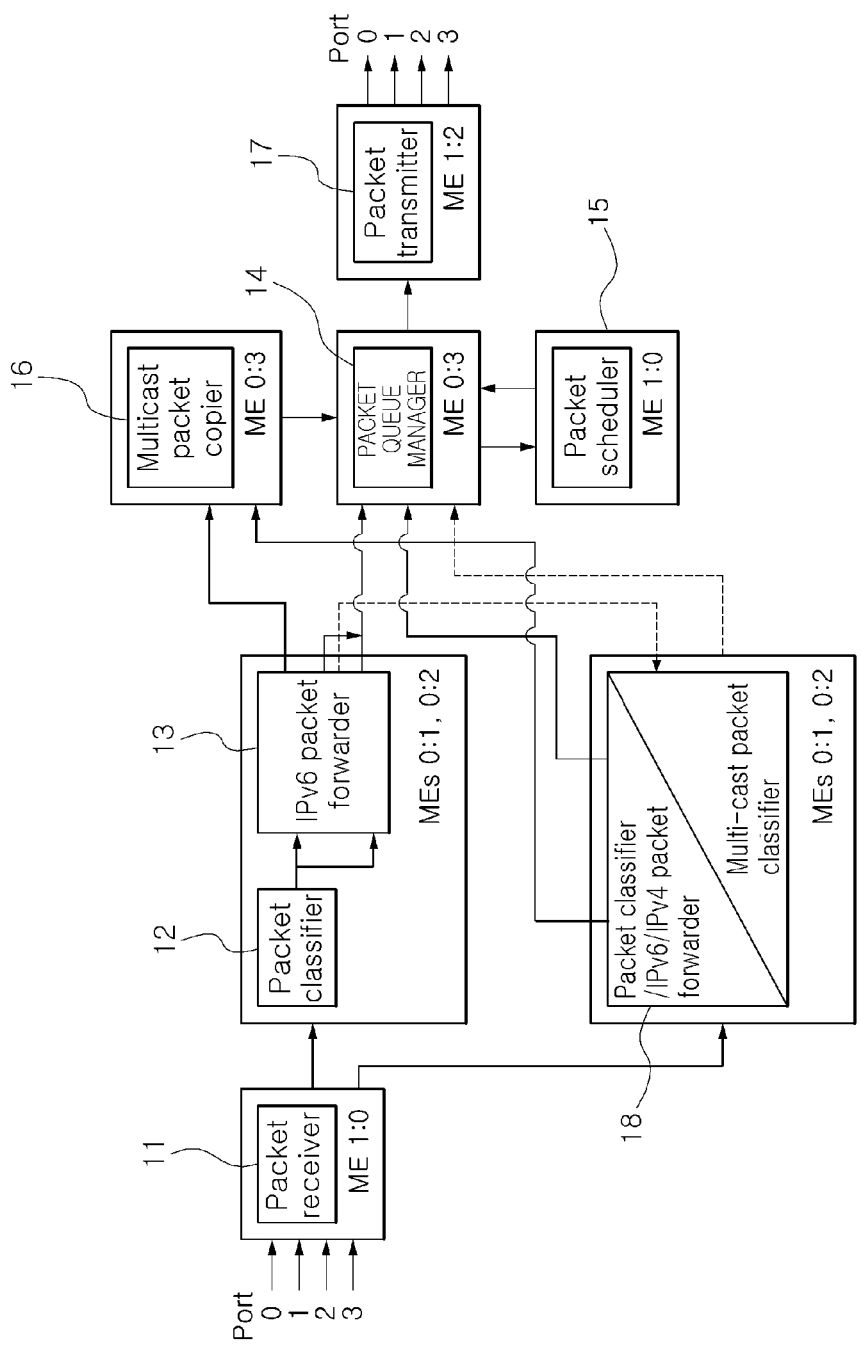
FIG. 1 is a view illustrating a configuration of a general IP packet processing apparatus using a network processor.
Figure 2:
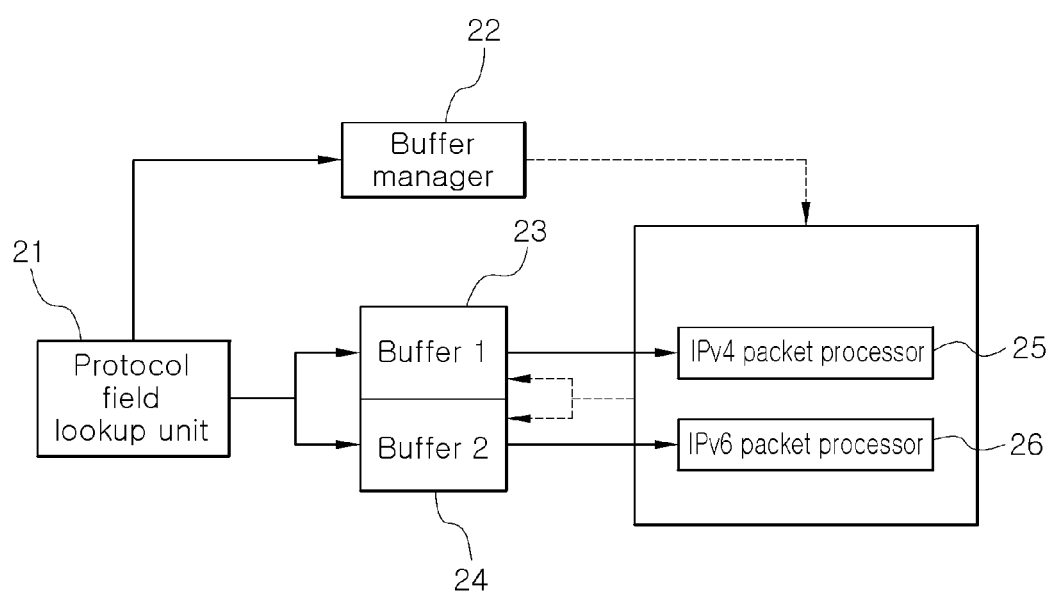
FIG. 2 is a view illustrating a configuration of a general packet processing apparatus.
Figure 3:
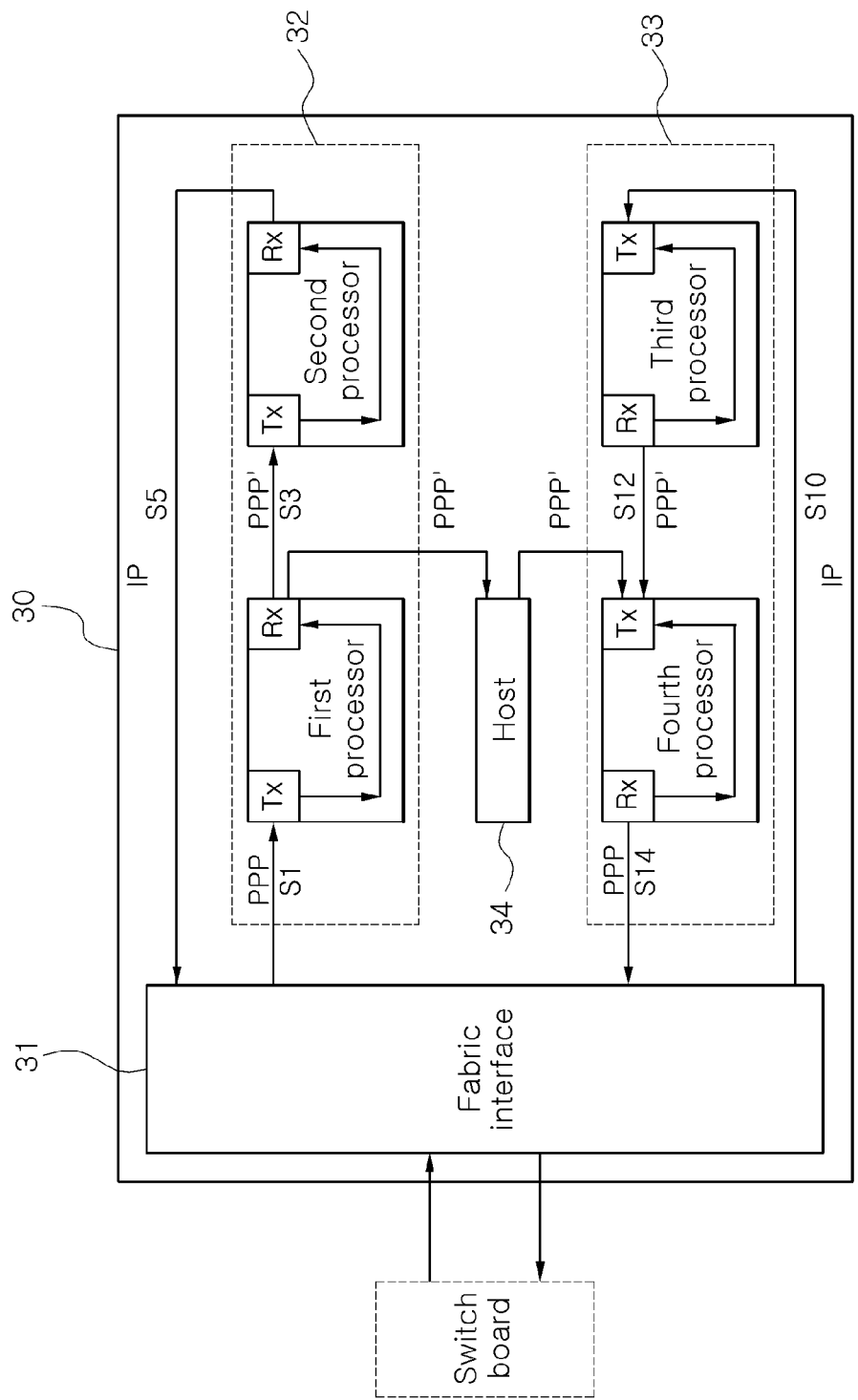
FIG. 3 is a view illustrating a configuration of a general PPP data frame processing apparatus.
Figure 4:
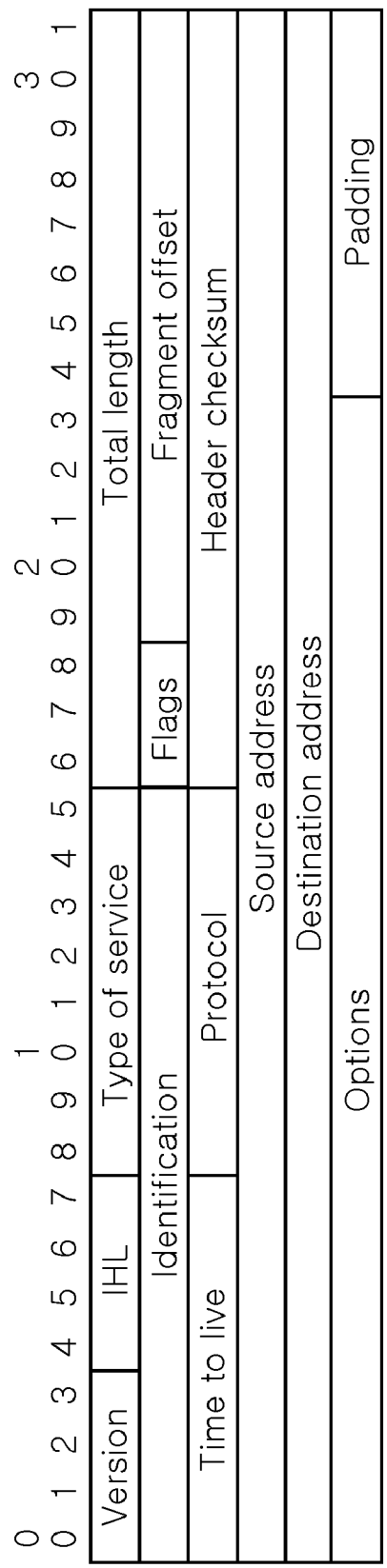
FIG. 4 is a view illustrating a structure of a general IPv4 basic header format.
Figure 5:
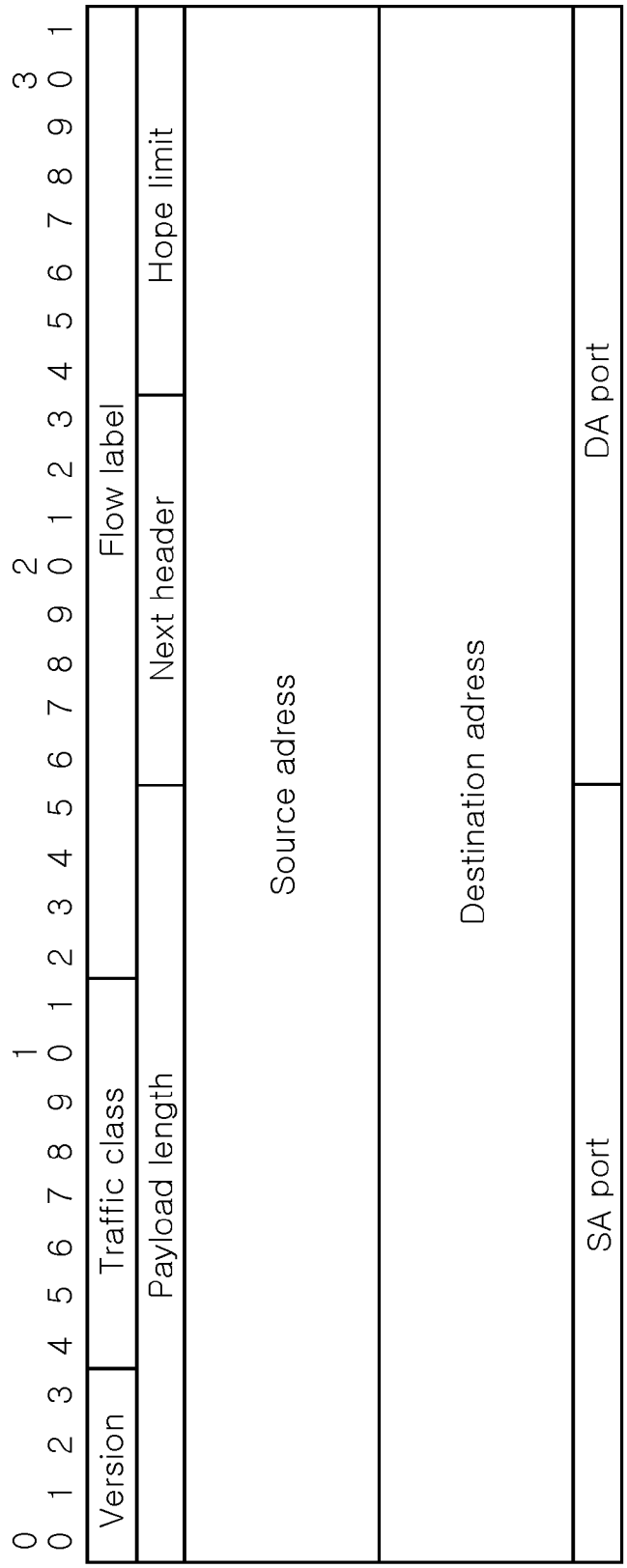
FIG. 5 is a view illustrating a structure of a general IPv6 basic header format.
Figure 6:
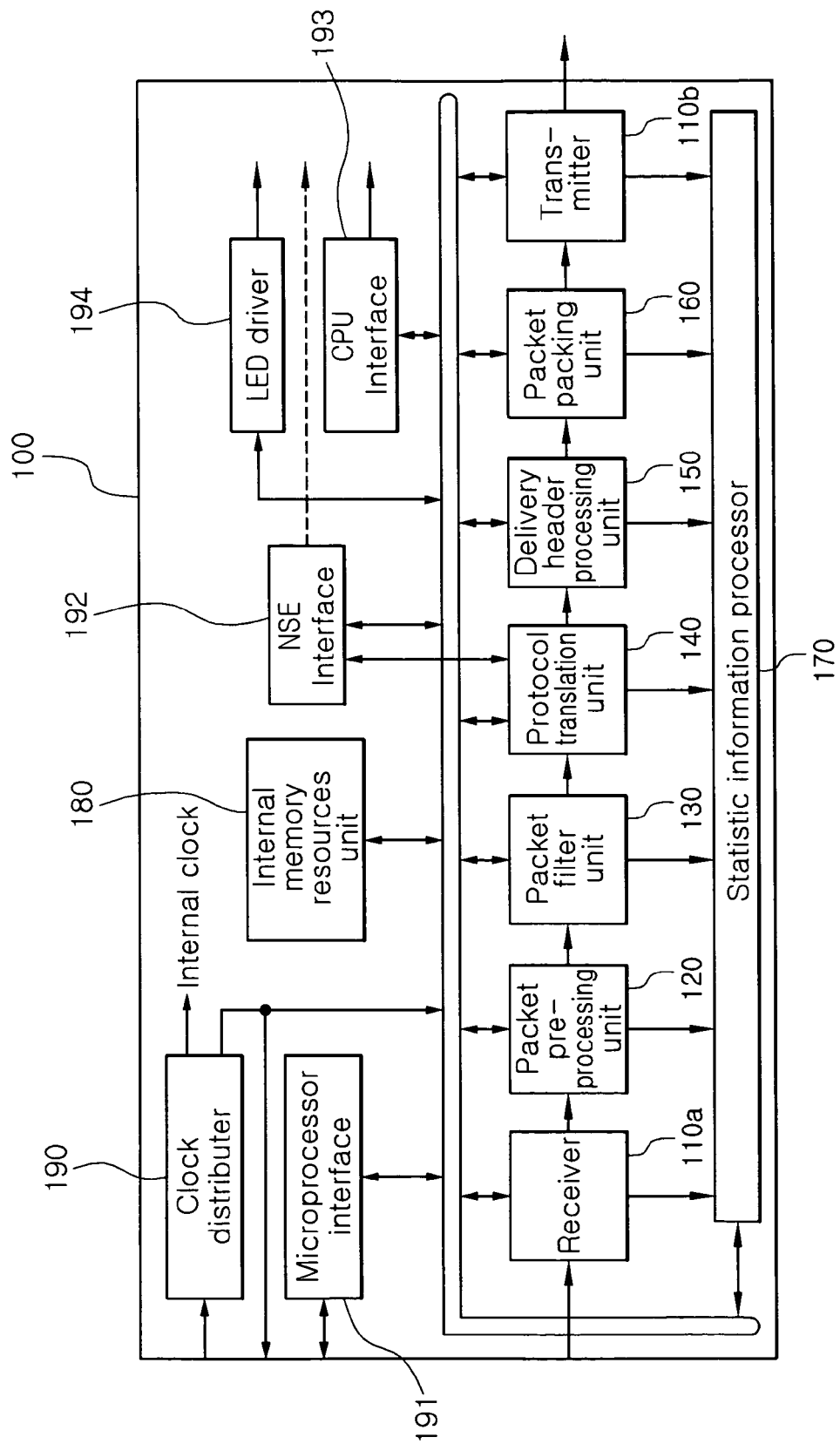
FIG. 6 is a view illustrating a configuration of a packet processing apparatus according to an embodiment of the present invention.

FIG. 6 is a view illustrating a configuration of a packet processing apparatus according to an embodiment of the present invention.

Referring to FIG. 6, the packet processing apparatus 100 performs basic processing by using only hardware logics s, adds delivery header DH without a decrease in a line speed so as to support quality of service (hereinafter, referred to as QoS) and various types of protocols, and transforms the packet header. The packet processing apparatus 100 include a receiver 110a, a transmitter 110b, a packet pre-processing unit 120, a packet filter unit 130, a protocol translation unit 140, a delivery header processing unit 150, a packet packing unit 160, a statistic information processing unit 170, an internal memory resources unit 180, a clock distributor 190, and various interfaces. Here, the various interfaces includes a micro processor interface 191, a network search engine (hereinafter referred to as NSE) interface 192, a central processing unit (CPU) interface 193, and LED drivers 194.

The receiver 110a receives a packet (input packet) input from 1-gigabit Ethernet or 10-gigabit Ethernet external commercial media access control (hereinafter, referred to as MAC) chip through an SPI interface, converts the packet into 64-bit, that is, a data bus size, and generates data control signals.

The packet pre-processing unit 120 receives various types of data control signals generated in the receiver 110a, analyzes a second layer (Layer_2) header of the input packet to generate basic delivery headers such as transitional header TH, a first delivery header DH_1v4, and performs a fading removing function and Layer_2 associated processes including L2 tunnel.

The packet filter unit 130 includes an MAC filter, a frame check sequence (FCS) filter, a maximum receive unit (MRU) filter, a virtual LAN filter, and the like. The packet filter unit 130 checks and marks Ethernet FCS errors and performs MRU packet size filtering, Ethernet destination addresses filtering, and Ethernet source address filtering based on source ports, VLAN IDs, and Ethernet source addresses.

The protocol translation unit 140 includes modules of protocol engines performing packet processing functions on various types of packets such as an IPv4 packet, an IPv6 packet, an MPLS packet, and an IPv4 tunnel packet. The configuration thereof will be described later in detail with reference to FIG. 7.

The delivery header processing unit 150 removes the transitional header TH among the delivery headers generated by the packet pre-processing unit 120 and loads the PPP header according to packet types.

The packet packing unit 160 removes unnecessary bytes from the input packet, packs empty bytes of the input packet, and adjusts an end-of-packet (EOP) position of a valid data according to the removed bytes.

The transmitter 110b converts into the SPI interface signals control signals and a 64-bit internal data bus and transmit the converted signals through the SPI interface to the network processing unit or the packet processing unit.

The statistic information processing unit 170 processes various types of statistic information obtained by a packet counter, a byte counter, an error counter, and the like.

The internal memory resources unit 180 controls internal registers and modules and performs memory accessing functions for accessing read/write registers, dual-port RAMs (DPRAMs), and the like.

The clock distributor 190 generates all the clock signals used for the packet processing apparatus 100 and distributes locked-in clock signals to blocks.

The microprocessor interface 191 is interfaced to an external CPU. The microprocessor interface 191 decodes input addresses to generate chip selection signals and read/write enable signals for registers of each module.

The NSE interface 192 is interfaced to an external commercial NSE. The NSE interface 192 receives a key value extracted by IPv6 processing engine in the protocol translation unit 140 to transfer the key value to the NSE. In addition, the NSE interface performs longest-prefix-matching (LPM)/QoS/denial-of-service (DoS) lookup of the NSE and, after that, transfer a resulting indices to the IPv6 processing engine in the protocol translation unit 140.

The CPU interface 193 provides a CPU packet for controlling an external commercial MAC chip.

The LED driver 194 collects various types of state information in an easily-searched form and transmits the state information to an external side.

Figure 7:
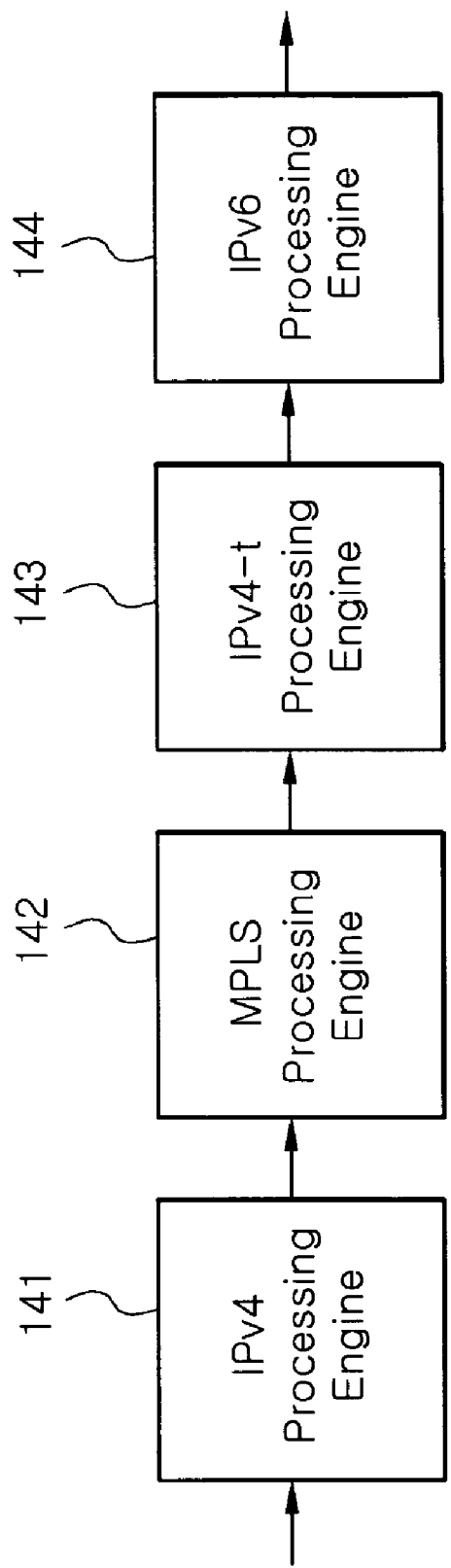
FIG. 7 is a view illustrating an example of a protocol translation unit according to an embodiment of the present invention.
Figure 8A:
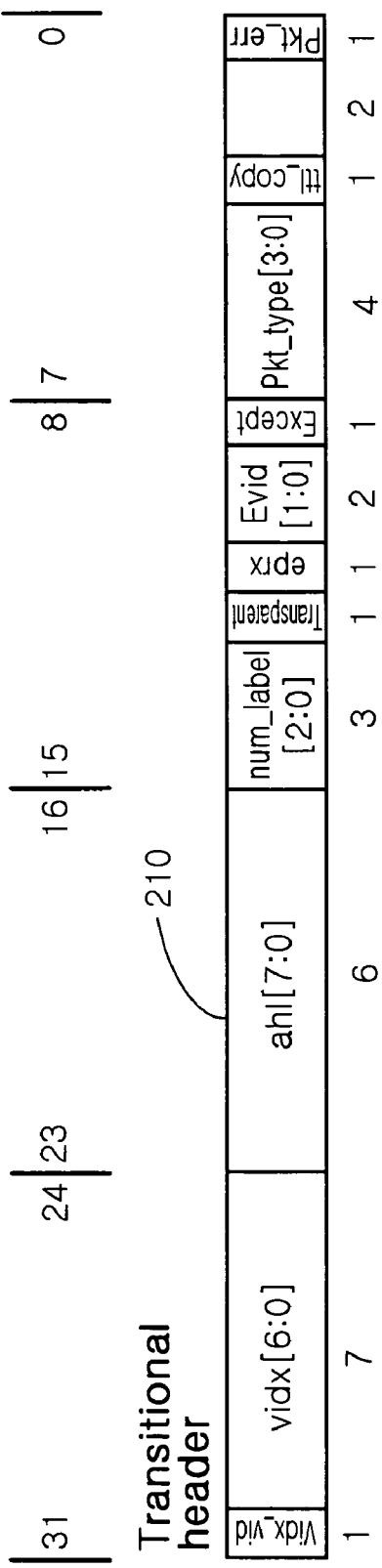
FIG. 8A to 8E is a view illustrating an example of delivery headers according to an embodiment of the present invention.
Figure 8B:
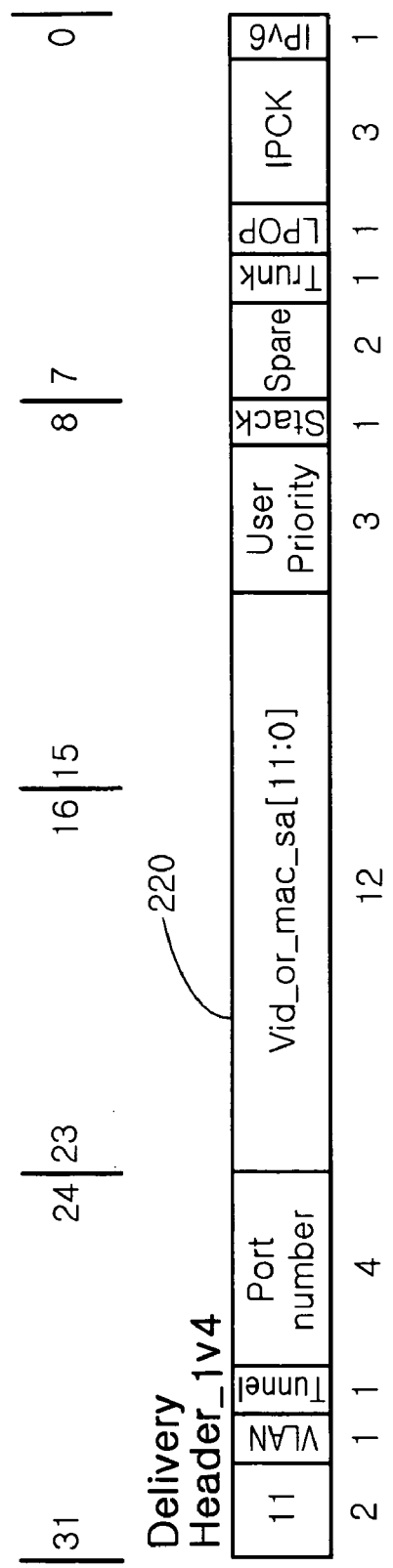
Figure 8C:
Figure 8D:
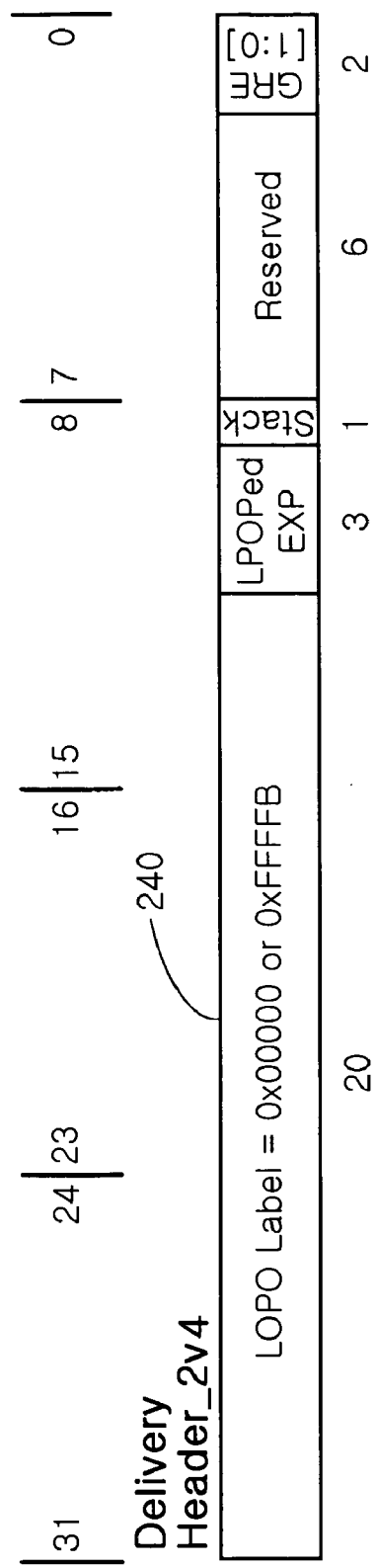
Figure 8E:
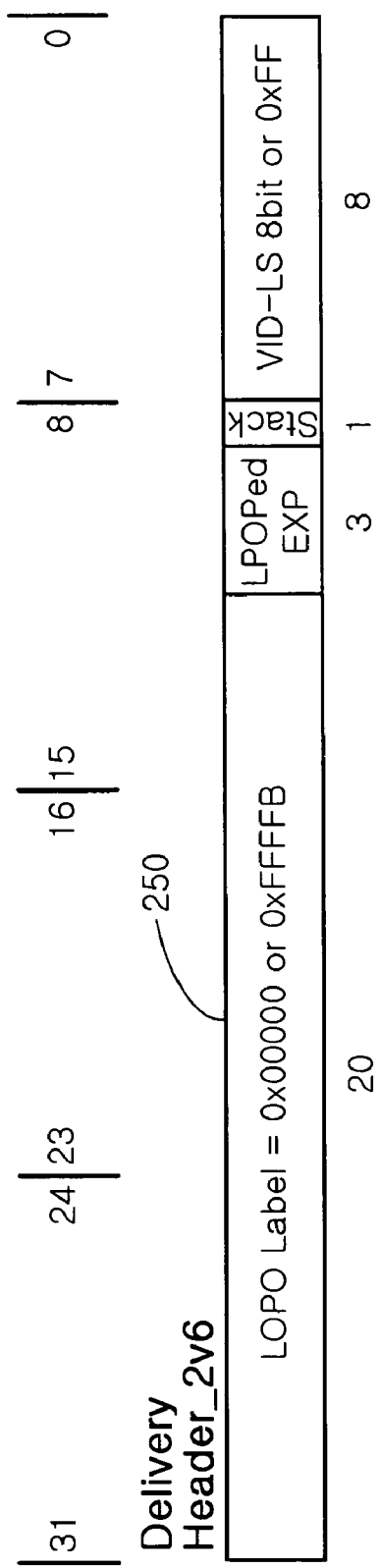
Figure 9B:
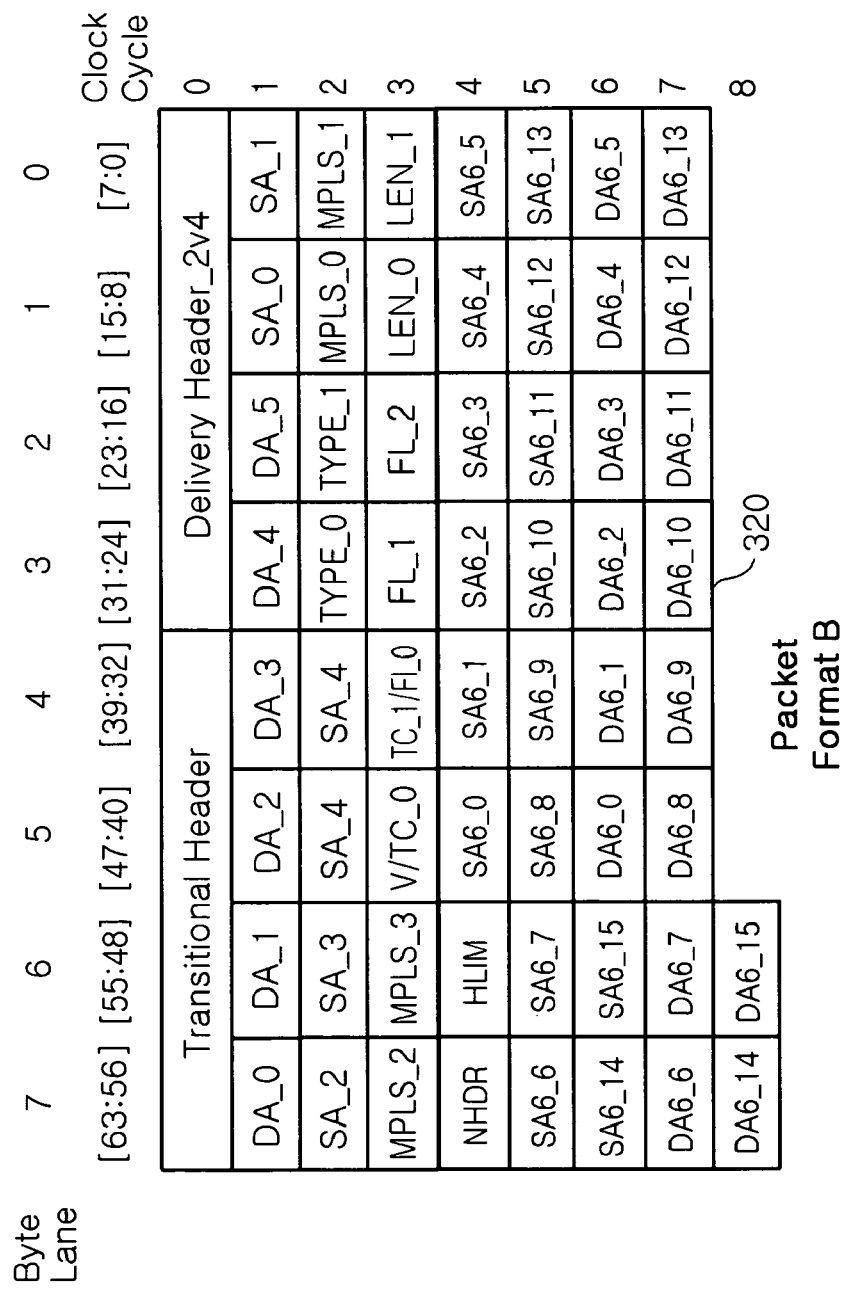
Figure 9D:
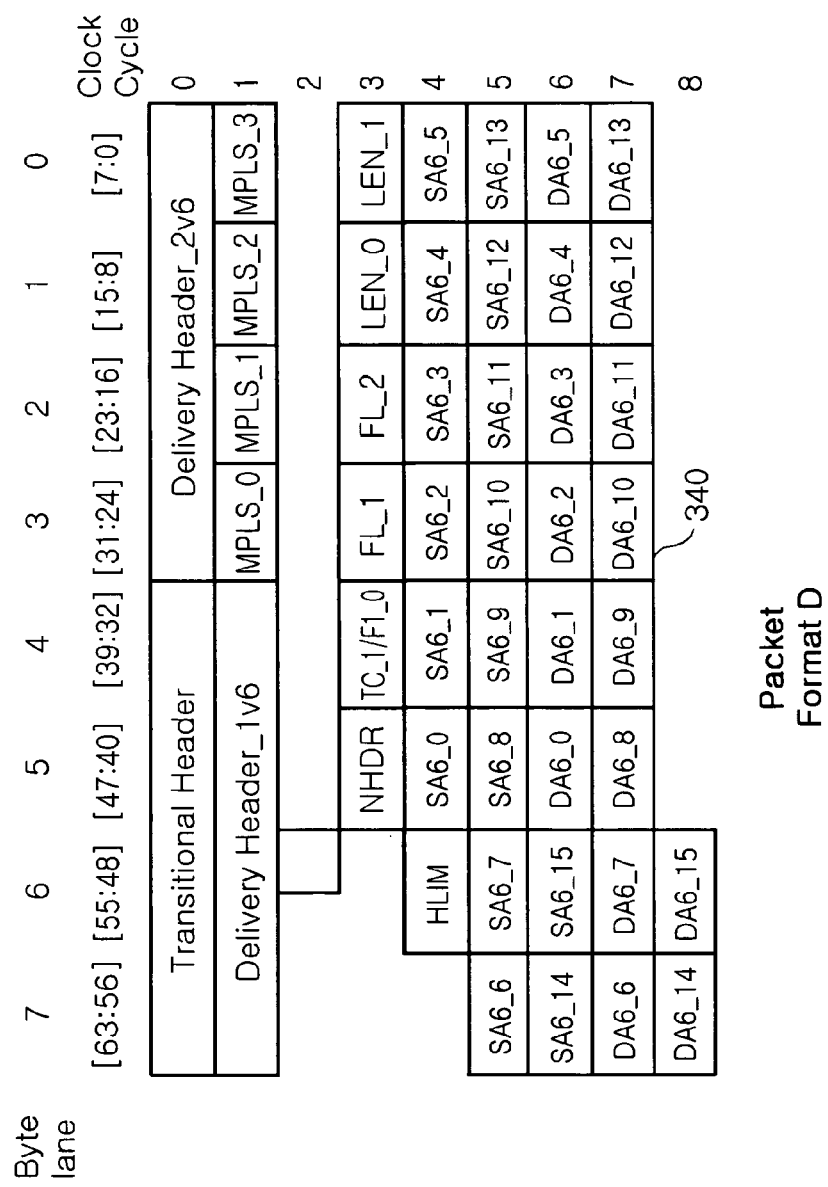
Figure 9E:
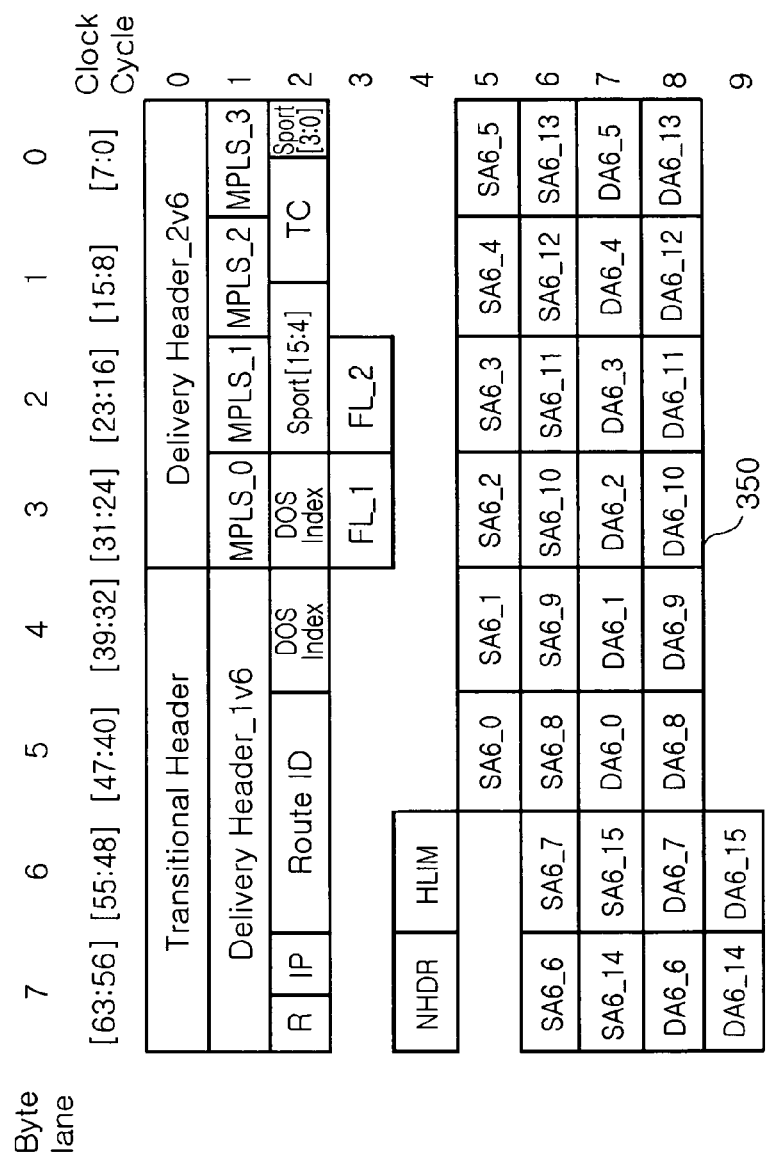
Figure 9F:
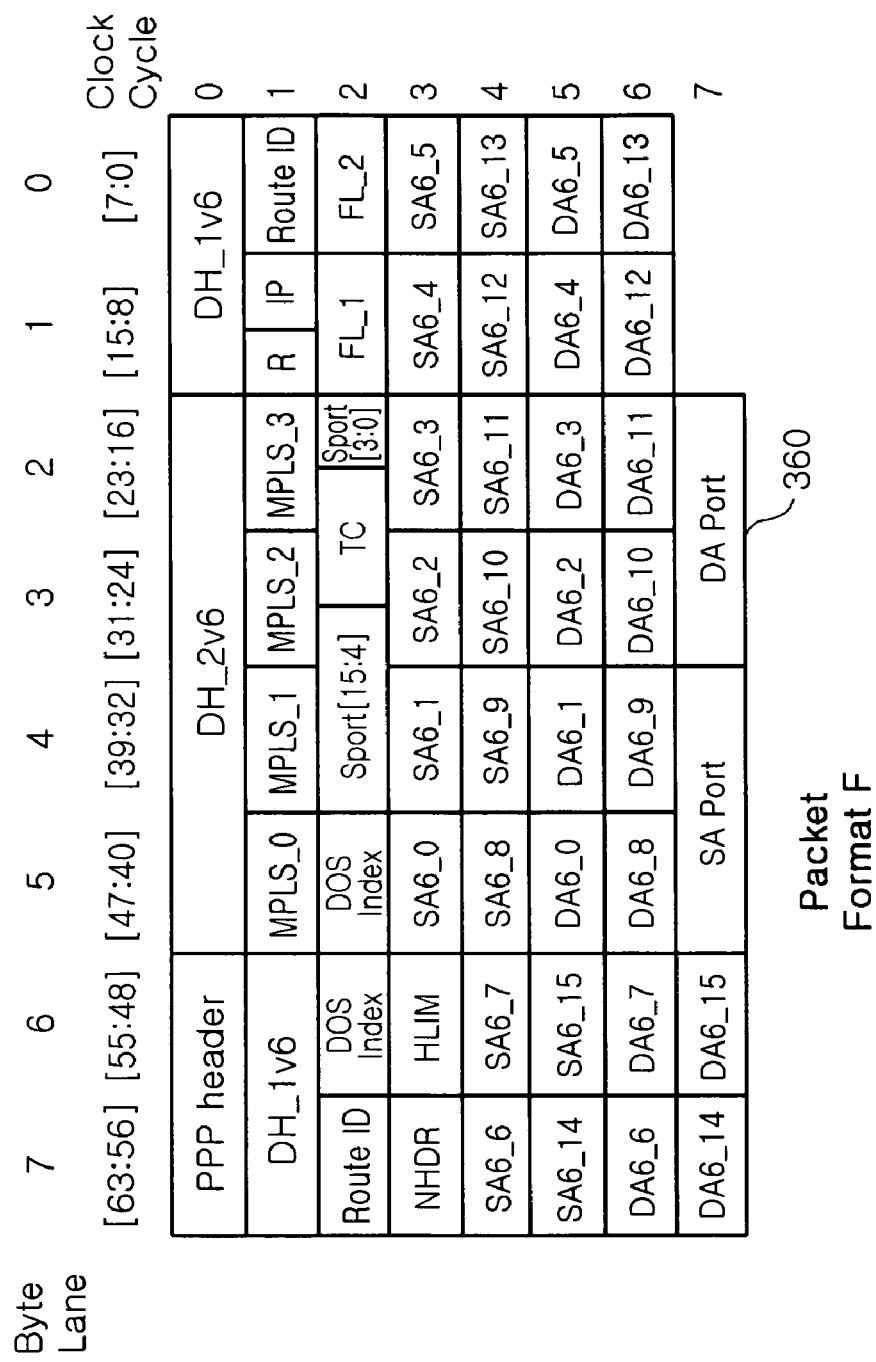

FIG. 7 is a view illustrating an example of the protocol translation unit according to the embodiment of the present invention.

Referring to FIG. 7, the protocol translation unit 140 mainly includes an IPv4 processing engine 141 for processing the IPv4 packet, an MPLS processing engine 142 for processing the MPLS packet, an IPv4-t processing engine 143 for processing the IPv4 tunnel packet, and an IPv6 processing engine 144 for processing the IPv6 packet. Interfaces among all the engines are the same, and each of engines is constructed with a module. Therefore, only if a specific engine is required, the Evld[1:0] signal of the transitional header TH is updated, so that the required engine can be inserted or removed.

The IPv4 processing engine 141 analyzes a packet type of the delivery header and an aggregate header length (AHL) of the input packet from the packet filter unit 130, that is, the filtered packet. If the input packet is an IPv4 packet, the IPv4 processing engine parses the header of the IPv4 packet and calculates a header checksum and updates the header of the IPv4 packet. In addition, the IPv4 processing engine 141 checks a packet length and a total length field of an 802.2 LLC packet. If fading occurs, the IPv4 processing engine adjusts a mask and end-of-packet (EOP) of the packet to removing the fading. If the packet is not an IPv4 packet, the IPv4 processing engine bypasses the packet.

If the input packet from the packet filter unit 130, that is, th filtered packet is an MPLS packet, the MPLS processing engine 142 generates a third delivery header DH_2 v4 and a fourth delivery header DH_2 v6 and updates the transitional header TH such as time-to-live (TTL) copy for LPOPed MPLS label, and MPLS stack bit and the first delivery header DH_1 v4. If the input packet is not an MPLS packet, the MPLS processing engine bypasses the packet.

If the input packet from the packet filter unit 130, that is, the filtered packet is a tunnel packet, the IPv4-t processing engine 143 decapsulates 6 to 4 tunnels and 6 over 4 tunnels and looks up the tunnels by using an internal CAM. If the input packet is not a tunnel packet, the IPv4-t processing engine 143 bypasses the packet.

If the input packet from the packet filter unit 130, that is, the filtered packet is an IPv6 packet, the IPv6 processing engine 144 parses the IPv6 packet header to extract various key values, combines the key values for external commercial NSE lookup to transfer the combined key values to the NSE interface 192, and generates 20-bit Hash value by using a Hash algorithm. In addition, the IPv6 processing engine 144 converts the first delivery header DH_1 v4 into the second delivery header DH_1 v6 and rearranges the IPv6 packet header by using a result of the lookup transferred from the NSE interface 192.

Now, a procedure for converting the delivery headers inserted so as not to decrease the line speed to the packet headers in the packet processing apparatus having the aforementioned configuration will be described in detail with reference to the accompanying drawings.

FIG. 8A to 8E is a view illustrating an example of the delivery headers according to an embodiment of the present invention.

Referring to FIG. 8A to 8E, the delivery headers may be classified into basic delivery headers such as a transitional header TH, a first delivery header DH_1 v4, and a second delivery header DH_1 v6 and new delivery headers such as a third delivery header DH_2 v4 and a fourth delivery header DH_2 v6.

The transitional header TH includes a signal vidx_vld representing whether or not the VLAN index is valid, vidx[6:0] representing a valid provisioned VLAN index if the vidx_vld signal is in a high level, 8-bit AHL[7:0] prepared to facilitate processing various types of packets in the protocol translation unit 140, 3-bit num_labels [2:0] representing the number of MPLS labels, 1-bit transparent flag, 1-bit eprx, 2-bit Evld[1:

0] representing availability of the engines of the protocol translation unit 140, 1-bit Except bit, 4-bit pkt_type[3:0] representing a type of the input packet, 1-bit ttl_copy, and 2-bit loc[1:0] representing positions of the first delivery header DH_1 v4 and the second delivery header DH_1 v6, and 1-bit pkt_err.

The first delivery header DH_1 v4 includes 2-bit ones[1:0], 1-bit vlan flag representing whether or not a packet has a VLAN tag and mapping the VLAN ID and the PRI field into the vid_or_mac_sa[11:0] and pri[2:0] of the first delivery header DH_1 v4 if the packet has the VLAN tag, 1-bit tunnel bit representing whether or not the input packet is an input from a tunneled port, 4-bit port[3:0], vid_or_mac_sa[11:0] for mapping 12-bit VLAN ID if the input packet has the VLAN and mapping 12-bit LSB source address if not, 3-bit pri [2:0] mapped to VLAN PRI bits if the input packet has the VLAN tag and set to zero if not, 1-bit stack representing an MPLS stack bit, 2-bit Spare, 1-bit Trunk, 1-bit lpop representing whether or not the packet is an actual MPLS packet, ipck[2:0] representing a result of the header checksum for the IPv4 packet in which ipck[2] is set if the IHL is not 5, ipck[1] is set if a result of checksum is not valid, and ipck[0] is set if the total length is less than 20, and 1-bit IPv6 flag for notifying that the first delivery header is updated to the second delivery header DH_1 v6.

The second delivery header DH_1 v6 includes hash_val [19:0] representing 20-bit Hash value obtained by using the Hash algorithm, pri[2:0] mapped to the VLAN PRI if the VLAN tag is set and set to zero if not, 1-bit stack equal to the MPLS Stack bit, 4-bit port[3:0], 1-bit lpop, 1-bit spare, 1-bit flow_label_zero bit set to flow_label_zero flag if Flow Label field is zero and representing that different IP/TCP/UDP fields are used in the Hashing for the flow, and 1-bit IPv6 bit representing whether or not the packet is an IPv6 packet.

The second delivery header DH_2 v4 and the fourth delivery header DH_2 v6 are inserted based on Hash flag extracted from Hash and Tunnel Flag tables. If the Hash condition of the DH_1 field is transparent, the LPOP label value becomes 20'h00000, and if not, the LPOP label value becomes 20'hFFFFB. The Hash condition is that a result of EPRX, Hash, tunnel table loop-up, LPOP flag, the number of MPLS labels, and a type of next packet are sequentially searched. If an actual MPLS LPOP label exists, the third delivery header DH_2 v4 or the fourth delivery header DH_2 v6 is not updated by the MPLS processing engine 142. At this time, the MPLS processing engine 142 updates the LPOP flag bit of the first delivery header DH_1 v4 instead of the second delivery header DH_2 v4 or the fourth delivery header DH_2 v6.

FIG. 9A to 9F is a view illustrating a packet transitioning operation in the packet processing apparatus according to an embodiment of the present invention. In FIG. 9, examples where the input packet is an IPv6 packet, an MPLS packet, and Ethernet packet are illustrated.

A packet format A 310 is a format of packet in a case where the input packet passes through the SPI interface and the receiver 110a and is converted to a 64-bit format.

A packet format B 320 is a format of packet in a case where the packet passes through the packet processing unit 120 and the delivery header and the first delivery header DH_1 v4 are inserted thereto according to a result of analysis of the second layer (Layer 2) header. The packet format B 320 is maintained until the packet filter unit 130 and, after the packet format B passes through the IPv4 processing engine 141, the transitional header TH and the first delivery header DH_1 v4 are updated.

A packet format C 330 is a format of packet in a case where the MPLS processing engine 142 analyzes the transitional header TH and the first delivery header DH_1 v4 and insets the third delivery header DH_2 v4 thereto.

A packet format D 340 is a format of packet obtained by re-adjusting a configuration of the header in a case where the input packet is an actual MPLS packet. The packet format is forwarded to the IPv4-t processing engine 143. Since the packet is not a tunnel packet, the IPv4-t processing engine 143 does not perform format conversion. If the packet is a '6 to 4' tunnel packet or a '6 over 4' tunnel packet, the IPv4-t processing engine 143 removes the IPv4 header and forward the packet to the IPv6 processing engine 144.

A packet format E 350 is a format of packet obtained by inserting lookup results and rearranging the packet by using a header analysis scheme of a commercial network processor or a packet processor. The lookup results are information of Router IDs, Dos IDs, QoS IDs, and the like obtained by the IPv6 processing engine 144 inserting a 20-bit Hash value (obtained by using an Hash algorithm) into the first delivery header DH_1v4 to convert the first delivery header DH_1 v4 to the third delivery header DH_1 v6 and transferring the extracted key values to the external commercial NSE.

A packet format F 360 is a format of packet obtained by the header processing unit 150 removing the transitional header T and inserting the 2-byte PPP header and the packet packing unit 160 removing unnecessary bytes of the packet and performing packing.

Clock cycles listed along the right side of each format represent 1 tick at the time of a real internal process. It can be understood that the clock cycles used for the real process are decreased or maintained, so that the line speed can be maintained.

Figure 10:
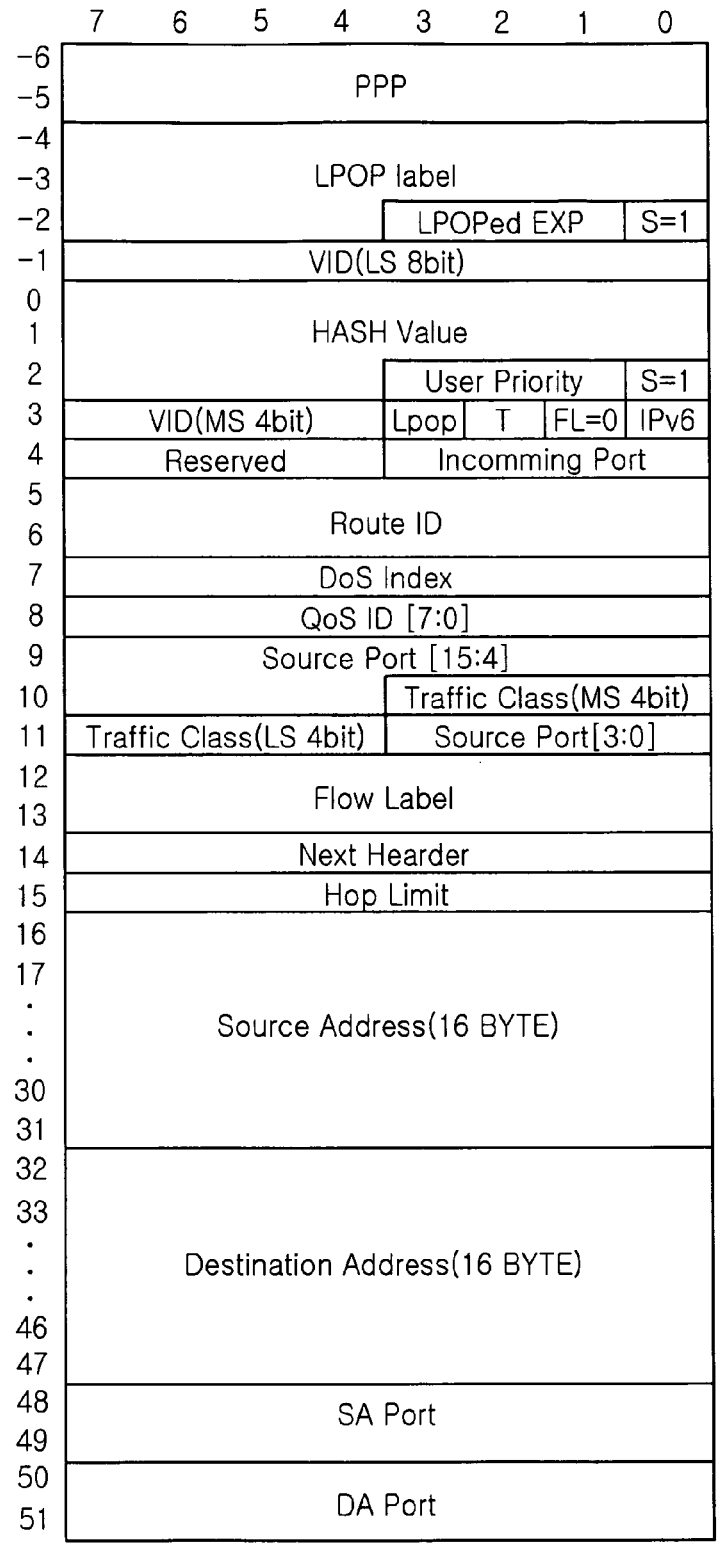
FIG. 10 is a view illustrating a structure of an IPv6 packet format of an packet processing apparatus according to an embodiment of the present invention.
Figure 11A:
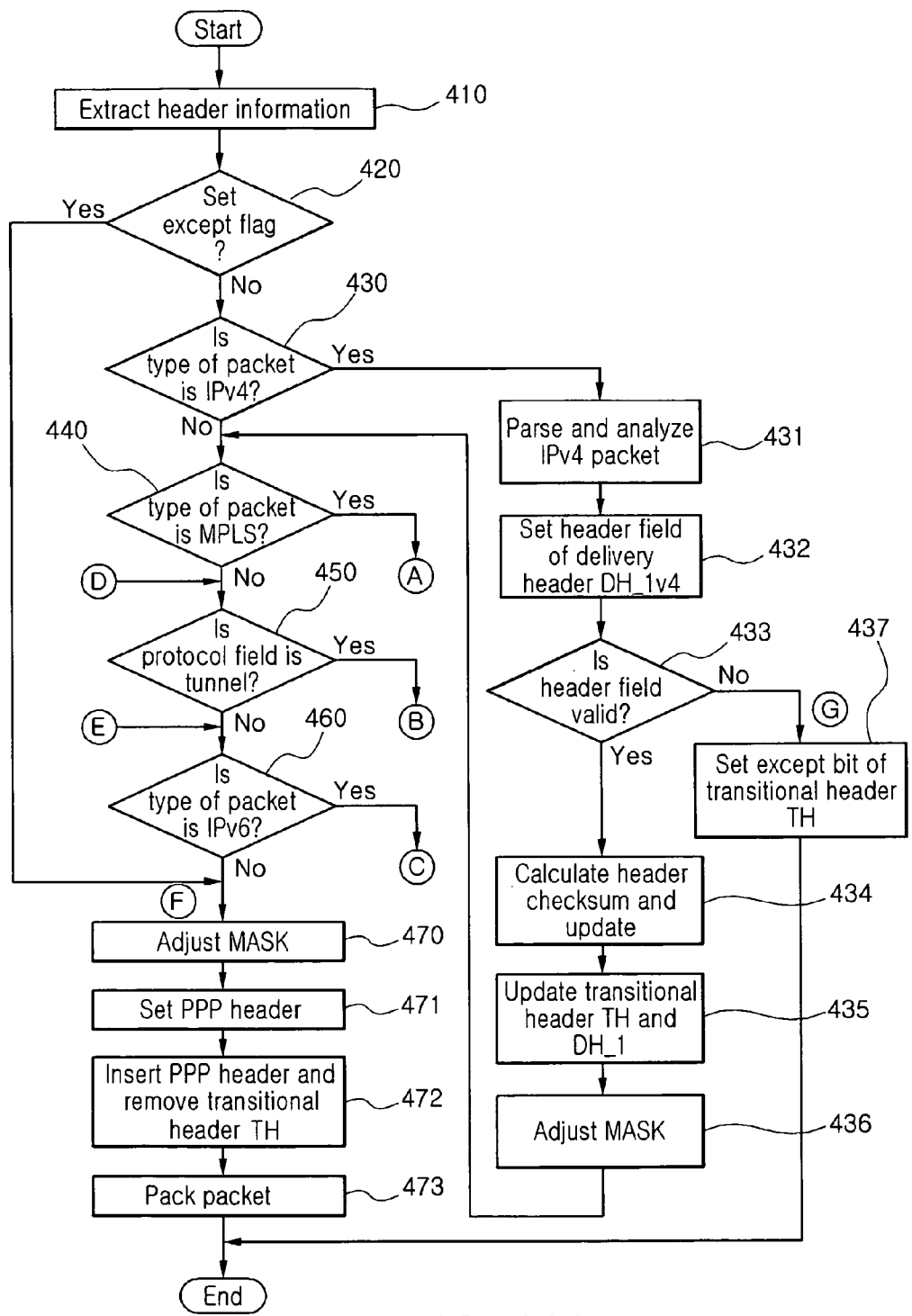
FIGS. 11A to 11D are views illustrating a packet processing procedure in a packet processing apparatus according to an embodiment of the present invention.
Figure 11B:
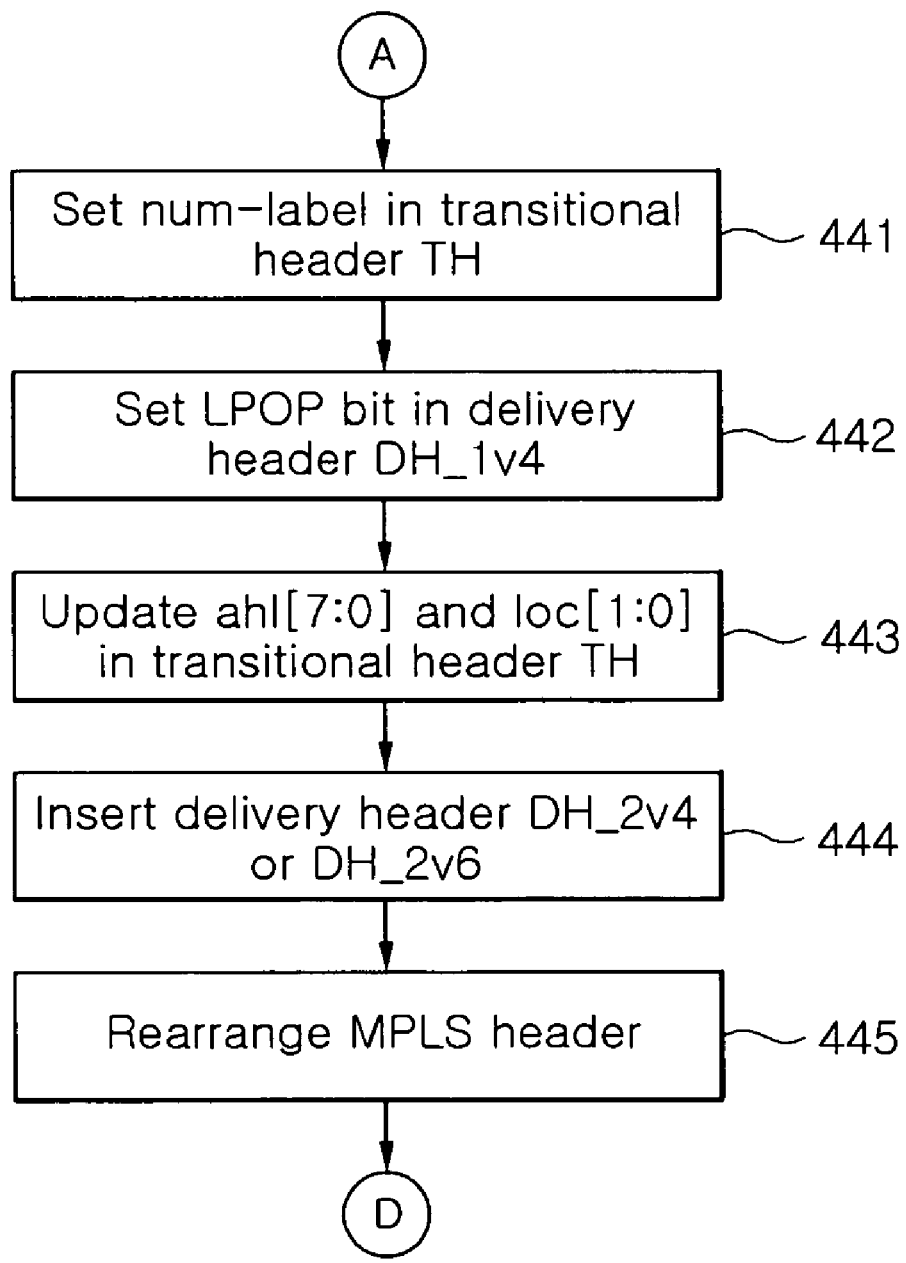
Figure 11C:
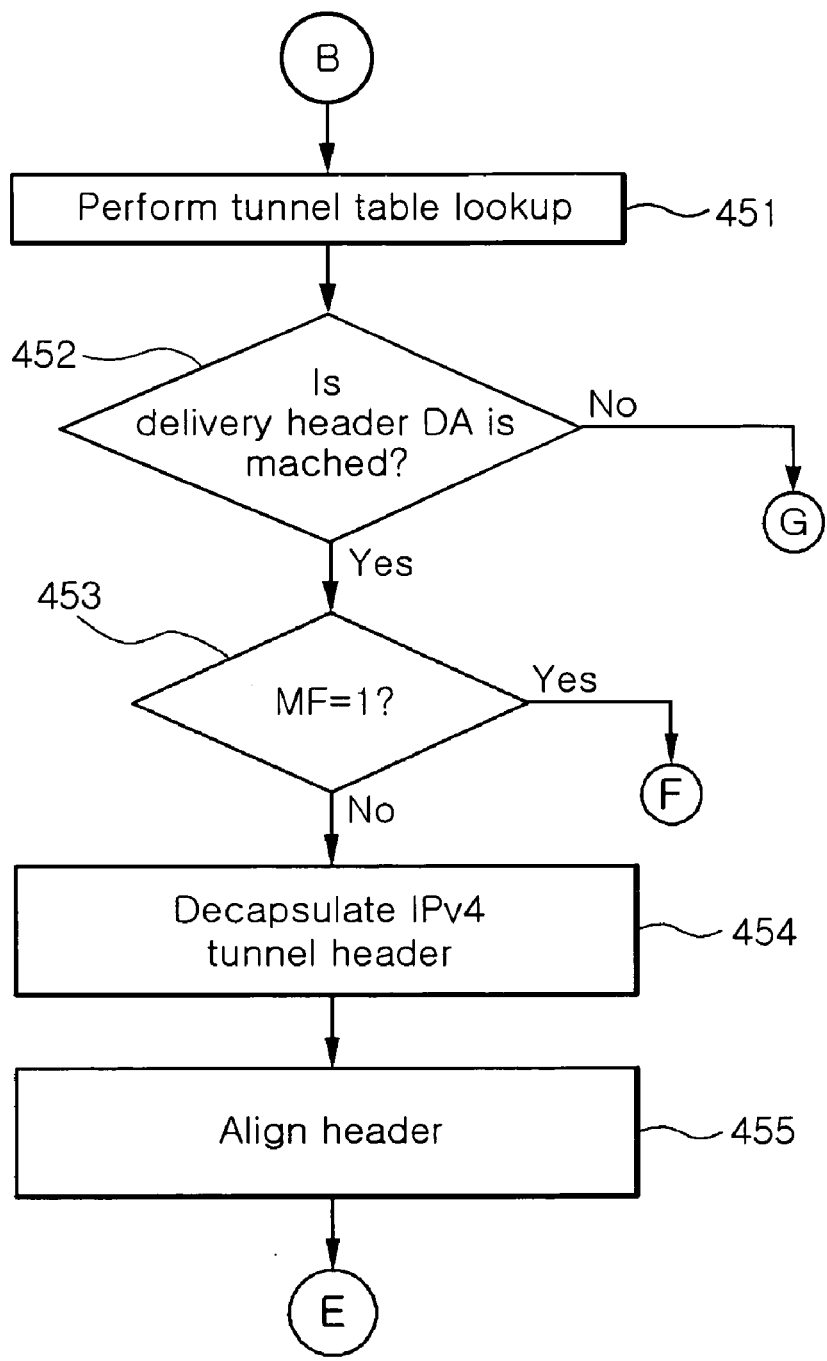
Figure 11D:
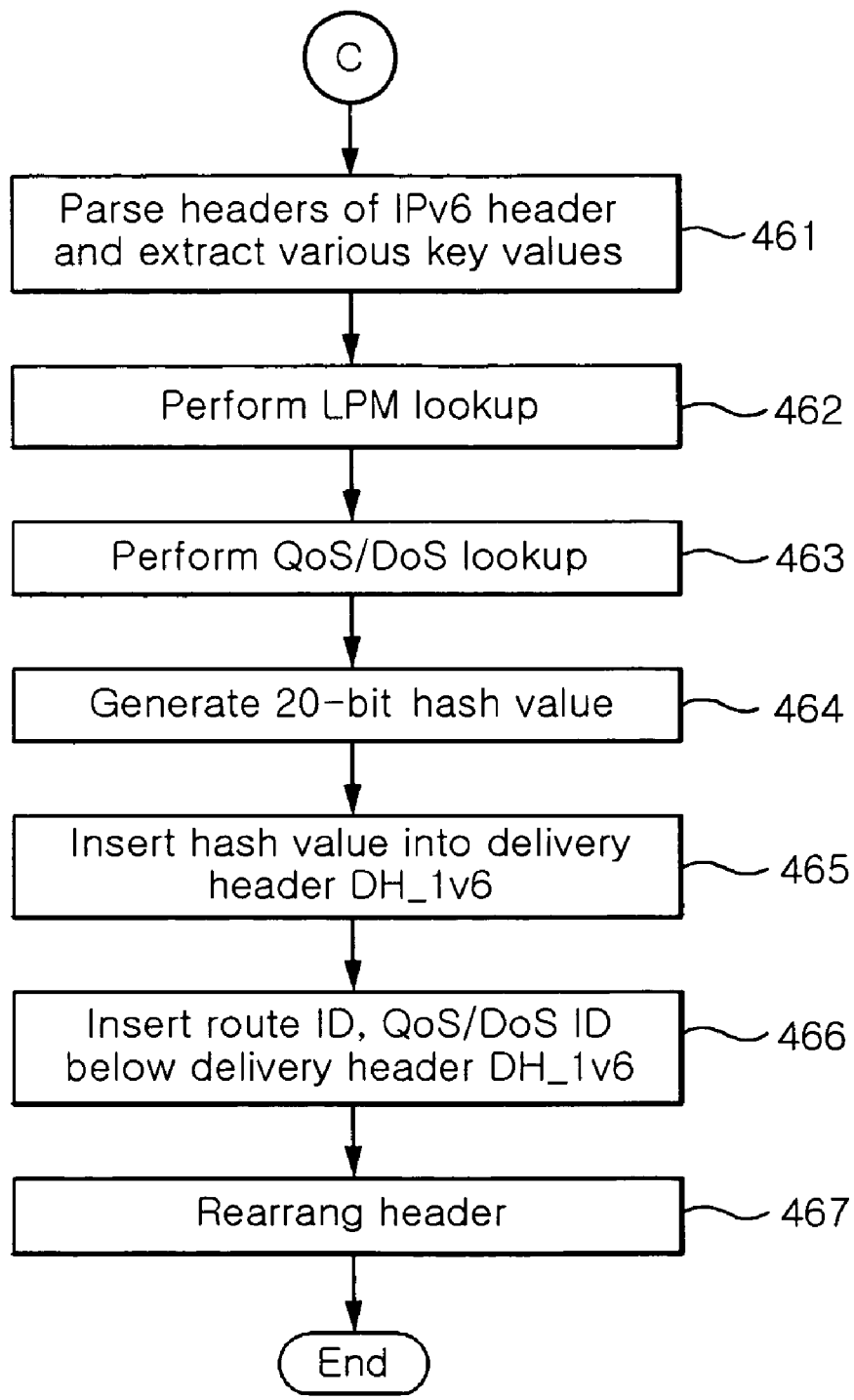

FIG. 10 is a view illustrating a structure of an output-stage IPv6 packet format of the packet processing apparatus according to the embodiment of the present invention. In the output-stage IPv6 packet format, the 2-byte PPP header and the next 4-byte delivery header DH_2 are the fields that are removed just after the network processor or the packet processor receives and acquires information. If the field Flow-_Label is zero and the next header is TCP or UDP, the SPORT [7:4] is copied to the Flow_label[19:16], and the DPORT[15: 0] is copied to the Flow_label[15:0], so that rearrangement is obtained.

Now, a method of processing a packet in the aforementioned packet processing apparatus is described in detail with reference to the accompanying drawings.

FIGS. 11A to 11D are views illustrating a packet processing procedure in a packet processing apparatus according to an embodiment of the present invention.

Referring to FIGS. 11A to 11D, the packet processing apparatus extracts packet header information from an input packet in operation 410 and determines whether or not an except flag is set in operation 420. As a result of the determination, if the except flag is set, the packet processing apparatus proceeds to operation 470. If not, the packet processing apparatus determines whether or not the packet type is an IPv4 packet in operation 430.

As a result of the determination in operation 430, if the packet type is the IPv4 packet, the packet processing apparatus parse and analyzes a header of the IPv4 packet in operation 431. In operation 432, the packet processing apparatus sets fields of a first delivery header DH_1 v4 according to results of the header analysis. Next, the packet processing apparatus determines whether or not the fields of the first delivery header DH_1 v4 are valid in operation 433. If the fields are valid, the packet processing apparatus calculates a header checksum and updates a result of the calculation to the IPv4 packet in operation 434. Next, the packet processing apparatus updates the transitional header TH and the first delivery header DH_1 v4 in operation 435. Next, in operation 436, if the IPv4 packet is an 802.2 LLC packet, the packet processing apparatus adjusts a mask so as to remove fading and proceeds to operation 440. If the fields of the first delivery header DH_1 v4 are not valid, the packet processing apparatus sets the except bit of the transitional header in operation 437 and ends the packet processing operations.

As a result of the determination in operation 430, if the input packet is not an IPv4 packet, the packet processing apparatus determines whether or not the packet type is an MPLS packet in operation 440. If the input packet is the MPLS packet, the packet processing apparatus sets num_label[2:0] to the transitional header TH in operation 441. Next, the packet processing apparatus sets an LPOP bit to the first delivery header DH_1 v4 of the MPLS packet in operation 442. Next, the packet processing apparatus updates an ahl[7:0] and an loc[1:0] in the transitional header TH in operation 443. Next, the packet processing apparatus inserts a third delivery header DH_2 v4 or a fourth delivery header DH_2 v6 in operation 444. Next, the packet processing apparatus rearranges the headers of the MPLS packet in operation 445.

As a result of the determination in operation 440, if the input packet is not an MPLS packet, the packet processing apparatus determine whether or not the protocol field is tunnel in operation 450. If the protocol field is tunnel, the packet processing apparatus determines that the input packet is a tunnel packet and performs tunnel table lookup in operation 451. Next, the packet processing apparatus determines whether or not the destination address is matched in operation 452. If the destination address is not matched, the packet processing apparatus proceeds to operation 437. If the destination address is matched, the packet processing apparatus determines the MF field is set to 1 in operation 453. As a result of the determination, if the MF field is set, the packet processing apparatus adjusts the mask in operation 470. If not, the packet processing apparatus decapsulates the header of the IPv4 tunnel packet in operation 454. Next, the packet processing apparatus aligns the header of the tunnel packet in operation 455 and proceeds to operation 460.

As a result of the determination in operation 450, if the input packet is not a tunnel packet, the packet processing apparatus determines whether or not the type of the input packet is an IPv6 packet in operation 460. As a result of the determination, if the type of the input packet is the IPv6 packet, the packet processing apparatus parses the header of the IPv6 packet in operation 461. Next, the packet processing apparatus extracts various types of key values for lookup and performs longest prefix matching (LPM) lookup by using the IPv6 destination address. Next, the packet processing apparatus performs QoS/DoS lookup by using the various key values in operation 463. Next, the packet processing apparatus generates 20-bit Hash values by using the Hash algorithm in operation 464. Next, the packet processing apparatus inserts the Hash values to the second delivery header DH_1 v6 of the IPv6 packet in operation 465. Next, the packet processing apparatus inserts the Route ID and the QoS/DoS ID obtained from the commercial NSE below the second delivery header DH_1 v6 of the IPv6 header in operation 466. Next, the packet processing apparatus rearranges the headers of the IPv6 packet in operation 467.

As a result of the determination in operation 460, if the input packet is not an IPv6 packet, the packet processing apparatus adjusts mask so as to remove unnecessary bytes in operation 470. Next, the packet processing apparatus sets 2-byte PPP header according to the type of header in operation 471. Next, the packet processing apparatus inserts the PPP header and removes the transitional header in operation 472. Next, the packet processing apparatus removes unnecessary bytes from the packet (to which the PPP header is inserted and from which the delivery header is removed) in operation 473. Next, the packet processing apparatus adjusts the EOP position and packs the packet. Next, the packet processing apparatus ends the packet processing operations.

As described above, according to the present invention, in a case where a conventional network processor or packet processor performs processing by using only PPP and MPLS protocols without support of the Ethernet, it is possible to process various types of Ethernet packets without addition processing operations of the network processor or the packet processor. In addition, basic packet processing operations can be performed by using only hardware logics.

In addition, according to the present invention, it is possible to optimize a use efficiency of the network processor by inserting delivery headers and transforming packet headers without a decrease in the line speed so as not to support QoS and various types of the protocols.

In addition, according to the present invention, since protocol engines are constructed with a module, only specified protocols can be loaded, so that it is possible to configure a system supporting the specified protocols without change in the system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A packet processing apparatus comprising:
a receiver converting an input packet to a packet having an internal data bus size and generating a data control signal;
a packet pre-processing unit analyzing the input packet transferred from the receiver to generate basic delivery headers and performing a second layer associated process;
a protocol translation unit processing the input packet according to a type of the input packet and the protocol translation unit including modules of protocol engines for inserting and removing necessary engines;
a header processing unit removing a transitional header TH in the generated delivery header and inserting a PPP (point-to-point protocol) header in the input packet;
a transmitter converting the input packet and the control signal and transmitting a converted packet and a converted control signal;
a statistic information processing unit processing statistic information associated with the processing of the input packet;
an LED (a light-emitting diode) driver collecting state information and transferring the collected state information to an external side;
a microprocessor interface interfacing with an external CPU (central processing unit);
an external commercial NSE (network search engine) interface transferring key values extracted by the protocol translation unit to an external commercial NSE and transferring a lookup result obtained by the external commercial NSE to the protocol translation unit; and
a CPU interface unit controlling an external commercial MAC (media access control) chip.

2. The packet processing apparatus of claim 1, further comprising a packet filter unit filtering the input packet transferred from the packet pre-processing unit in association with the second layer and transferring the input packet to the header processing unit.

3. The packet processing apparatus of claim 2, wherein the packet filter unit checks Ethernet-associated error of the input packet and performs maximum reception unit packet size filtering, Ethernet destination address filtering, or Ethernet source address filtering.

4. The packet processing apparatus of claim 2, further comprising a packet merge unit removing unnecessary bytes from the input packet transferred from the header processing unit and merging empty bytes.

5. The packet processing apparatus of claim 4, further comprising a statistic information processing unit processing statistic information associated with the processing of the input packet.

6. The packet processing apparatus of claim 5, further comprising:
   an internal memory resources unit performing internal memory access; and
   a clock distributor generating internally-used clock signals and distributing the clock signals.

7. A packet processing apparatus comprising:
   a receiver converting an input packet to a packet having an internal data bus size and generating a data control signal;
   a packet pre-processing unit analyzing the input packet transferred from the receiver to generate basic delivery headers and performing a second layer associated process;
   a protocol translation unit processing the input packet according to a type of the input packet and the protocol translation unit including modules of protocol engines for inserting and removing necessary engines, wherein the protocol translation unit comprises:
      an IPv4 (Internet Protocol version 4) processing engine analyzing a delivery header of the filtered packet and parsing the header of an IPv4 packet to generate the IPv4 header if the packet type is the IPv4 packet,
      an MPLS (multi-protocol label switching) processing engine generating a new delivery header to update the delivery header included in the filtered packet if the filtered packet is an MPLS packet,
      an IPv4-t processing engine performing tunnel decapsulation and tunnel lookup if the filtered packet is a tunnel packet, and
      an IPv6 processing engine parsing the header of an IPv6 header, transferring extracted key value to the NSE, receiving lookup results from the external commercial NSE, and aligning the header of the IPv6 packet if the filtered packet is the IPv6 packet;
   a header processing unit removing a transitional header TH in the generated delivery header and inserting a PPP (point-to-point protocol) header in the input packet; and
   a transmitter converting the input packet and the control signal and transmitting a converted packet and a converted control signal.

8. The packet processing apparatus of claim 7, wherein, if the packet is an 802.2 LLC packet, the IPv4 processing engine checks a packet length field and a total length field, and if fading occurs, the IPv4 processing engine removes the fading.

9. The packet processing apparatus of claim 7, wherein the IPv6 processing engine generates Hash values by using a predetermined Hash algorithm and transitions a first delivery header DH_1 v4 included in the basic delivery headers to a second delivery header DH_1 v6.

10. A packet processing method comprising:
    changing a size of an input packet;
    analyzing the input packet and performing a second layer associated process;
    generating basic delivery headers of the input packet;
    processing the input packet to which the basic delivery headers are inserted, according to a type of the input packet, wherein the processing of the input packet to which the basic delivery headers are inserted according to the type of the input packet comprises:
       extracting header information of the input packet,
       parsing an header of an IPv4 packet and analyzing the IPv4 packet if the extracted header information represents that the type of the input packet is the IPv4 packet,
       setting a header field of the IPv4 packet,
       calculating a header checksum of the IPv4 packet and updating the header of the IPv4 packet if the header field is valid,
       updating a transitional header TH and a first delivery header DH_1 v4 among basic delivery headers of the IPv4 packet, and
       adjusting a mask of the IPv4 packet;
    transforming the header of the input packet to which the basic delivery headers are inserted; and
    transitioning the header-transformed input packet and delivering the packet, thereby processing various packets without addition of separate process to a packet processing apparatus.

11. The packet processing method of claim 10, further comprising, after the performing of the second layer associated process, filtering the input packet in associated with the second layer.

12. The packet processing method of claim 11, further comprising removing unnecessary bytes from the header-transformed input packet and merging empty bytes.

13. The packet processing method of claim 12, further comprising adjusting a mask to remove the unnecessary bytes.

14. The packet processing method of claim 10, wherein the processing of the input packet to which the basic delivery headers are inserted according to a type of the input packet further comprises setting an except bit to remove the transitional header from the basic delivery headers if the header field is not valid.

15. A packet processing method comprising:
    changing a size of an input packet;
    analyzing the input packet and performing a second layer associated process;
    generating basic delivery headers of the input packet;
    processing the input packet to which the basic delivery headers are inserted, according to a type of the input packet, wherein the processing of the input packet to which the basic delivery headers are inserted according to the type of the input packet comprises:
       extracting header information of the input packet,
       setting a portion of information of an transitional header TH and a first delivery header DH_1 v4 among basic delivery headers of an MPLS (multi-protocol label switching) packet if the extracted header information represents that the type of the input packet is the MPLS packet,
       updating the portion of information of the basic delivery headers,
       inserting a new delivery header into the MPLS packet, and
       aligning the header of the MPLS packet;

transforming the header of the input packet to which the basic delivery headers are inserted; and transitioning the header-transformed input packet and delivering the packet, thereby processing various packets without addition of separate process to a packet processing apparatus.

16. A packet processing method comprising:

changing a size of an input packet;

analyzing the input packet and performing a second layer associated process;

generating basic delivery headers of the input packet;

processing the input packet to which the basic delivery headers are inserted, according to a type of the input packet, wherein the processing of the input packet to which the basic delivery headers are inserted according to the type of the input packet comprises:

extracting header information of the input packet, performing tunnel table lookup of a tunnel packet if a protocol field of the extracted header information represents that the input packet is the tunnel packet, decapsulating an IPv4 tunnel header of the tunnel packet if the extracted header information represents that an IPv4 destination address is matched, and aligning the header of the tunnel packet;

transforming the header of the input packet to which the basic delivery headers are inserted; and transitioning the header-transformed input packet and delivering the packet, thereby processing various packets without addition of separate process to a packet processing apparatus.

17. The packet processing method of claim 16, further comprising:

setting an except bit of the transitional header TH of the basic delivery headers of the tunnel packet if the IPv4 destination address is not matched.

18. A packet processing method comprising:

changing a size of an input packet;

analyzing the input packet and performing a second layer associated process;

generating basic delivery headers of the input packet;

processing the input packet to which the basic delivery headers are inserted, according to a type of the input packet, wherein the processing of the input packet to which the basic delivery headers are inserted according to the type of the input packet comprises:

extracting header information of the input packet, parsing an header of an IPv6 packet and extracting key values if the extracted header information represents that the type of the input packet is the IPv6 packet, performing QoS (quality of service)/Dos (denial of service) lookup by using the extracted key values, generating Hash values by using a predetermined Hash algorithm, inserting the Hash values into the delivery header of the IPv6 packet, and aligning the header of the IPv6 packet;

transforming the header of the input packet to which the basic delivery headers are inserted; and transitioning the header-transformed input packet and delivering the packet, thereby processing various packets without addition of separate process to a packet processing apparatus.

19. The packet processing method of claim 18, further comprising:

converting the first delivery header DH_1 v4 of the basic delivery headers to a second delivery header DH_1 v6.

* * * * *